UNITED STATES PATENT OFFICE.

CHARLES A. DOREMUS, OF NEW YORK, N. Y.

PURIFYING WATER.

SPECIFICATION forming part of Letters Patent No. 404,180, dated May 28, 1889.

Application filed January 14, 1889. Serial No. 296,307. (No specimens.)

*To all whom it may concern:*

Be it known that I, CHARLES A. DOREMUS, a citizen of the United States, residing in the city, county, and State of New York, have invented a new and useful Improvement in Processes for Removing Calcium, Magnesium, and other Metals from Aqueous Solutions; and I do hereby declare that the following is a full, clear, and exact description of the invention, which will enable others skilled in the art to which it appertains to make and use the same.

For household and technical use waters are classified as "hard" or "soft." Those that are hard are subdivided into those which retain their hardness when boiled and those that lose their hardness when boiled. The former have "permanent" hardness, the latter "temporary" hardness. This classification is based chiefly upon the behavior of waters to soap, hard waters failing to give a lather.

The soap-destroying power of the water depends generally on the presence of salts of calcium (Ca) and magnesium (Mg) in the water. Temporary hardness is due to calcium (Ca) and magnesium (Mg) carbonates held in solution by an excess of carbon dioxide. When this is expelled by boiling, the calcium (Ca) and the magnesium (Mg) carbonates precipitate and the water becomes soft. Permanent hardness is due to other salts of calcium (Ca) and magnesium, (Mg.) There are also many waters possessing both permanent and temporary hardness. Strontium (Sr) and barium (Ba) salts behave similarly. Where the application of heat is impracticable, waters of either character may be treated with chemicals with the object of obviating the effect of any of the above-mentioned salts. For this purpose milk of lime, caustic alkali, carbonated alkali, barium sulphide, and other chemicals have been and are still employed with more or less success. When chemicals are used, the precipitate which they form is separated from the water by some convenient mechanical means—such, for instance, as a suitable filter.

Since hard waters when used in steam-boilers and like vessels form an incrustation or scale, chemicals are frequently added either to the water before it enters the boiler or in the boiler, with the object of preventing the formation of an adherent scale. In the manufacture of salt it is desirable to remove as far as possible all impurities, and for this purpose numerous mechanical and chemical means have been adopted. In many other technical pursuits, as in woolen and silk manufactures, it is often necessary to remove even small quantities of foreign substances from the water used for washing or the preparation of various solutions. In the processes heretofore used different substances have been employed, but there are inherent objections to each. Thus in the well-known Clark's process the lime softens only waters having temporary hardness and removes only a portion of the magnesium, (Mg.) Caustic soda has also been used to remove magnesium and calcium. It has an objection in the difficulties of handling. Though it acts on waters having both temporary and permanent hardness, it does not remove all the magnesium and may leave an objectional residue in the water. Ammonium chloride converts the calcium and magnesium into soluble forms, preventing incrustation, but not precipitating calcium and magnesium, the waters cannot be employed for domestic or technical use. "Soda-ash" softens only permanently hard waters and does not remove magnesium entirely. Barium sulphide will react chiefly on sulphates, but would leave with calcium and magnesium chlorides barium chloride in solution, which, for certain purposes, is quite as injurious as are calcium or magnesium salts. These are the substances that have been found most successful commercially in the treament of waters. By the use of a fluoride, any calcium or magnesium salt, whether the same renders water temporarily or permanently hard, has its calcium or magnesium converted into a fluoride, which is perhaps the most insoluble salt of either calcium or magnesium. A perfect precipitation therefore follows. With fluorides the reaction is not only much more delicate than any of the foregoing, but also takes place more rapidly, therefore doing away with the slow, cumbrous, and expensive methods which have hitherto obtained. The soluble residual products resulting from the action of a fluoride upon calcium and magnesium salts are less objectionable than those which result by the use of other chemicals where said chemicals leave a residuum. A fluoride can be employed which shall have none of the corrosive and injurious properties of caustic soda, lime, or soda-ash—a matter of the greatest importance in general and commercial usage. Any calcium or magnesium carbonate remaining suspended in a water will react with soap to produce a precipitate containing fatty acid. This is not the case where calcium or magnesium fluoride remains in suspension. This fact is of value in the purification of water for domestic or technical use.

That those skilled in the art may understand and apply my invention, the following is a description of one way in which it may be carried out:

The water to be treated may contain several salts of calcium (Ca) and magnesium, (Mg,) or only salts of calcium (Ca) or of magnesium, (Mg.) In any case I precipitate the calcium (Ca) or magnesium, (Mg,) or both, by the addition of some compound of fluorine, preferably in solution, though that is not essential. The calcium (Ca) and magnesium (Mg) form insoluble fluorides of calcium (Ca) and magnesium, (Mg,) which may be separated from the water or the water from them by any mechanical means.

In using my process it will probably be desirable to ascertain the nature of the solution by an analysis. Suppose a well-water was found to contain (per U. S. gallon) calcium sulphate, 3.0845 grains; calcium carbonate, 7.2194 grains; magnesium carbonate, 1.5377 grains. I have found by chemical calculation that the amount of compound of fluorine necessary to precipitate all the calcium (Ca) and magnesium (Mg) in the above instance is about ten grains of sodium fluoride for each gallon of water treated. The saturated solution of sodium fluoride was prepared and fed to the water in such proportion that each gallon of water received ten grains of fluoride. At once all the calcium and magnesium was precipitated as fluorides from the water. I have actually made this special application of the process and found the water after treatment practically free of calcium and magnesium.

The particular mode of application of the fluoride will depend upon the use to be made of the water. Thus if it is to be filtered the fluoride may be placed in the automatic feed of a filter, such as is in common use, and fed in proper proportion to the water. The precipitate is removed by the filter. To ascertain whether a sufficient amount of chemical has been added, the water may be tested before and after filtration, either by sodium fluoride or other reagent, for the presence of calcium, magnesium, or other foreign substance which the fluoride is to remove.

To determine that no excess of fluoride has been employed, the filtered water may be tested with a solution of calcium or other reagent capable of detecting traces of fluoride in the water.

Where exact quantities of reagent may be employed, either by weight or measure, to given quantities of water, a preliminary test as to the quantity of fluoride to be used will perhaps prove sufficient and the testing of the water after treatment may be omitted.

Since the character of the precipitate produced by a fluoride may be such that it is difficult for a filter to separate it from the water, it may prove advisable to use with the fluoride some chemical capable of producing with the foreign substances in the water a bulky precipitate which shall act mechanically in removing any precipitate of fluoride also produced. Since magnesium fluoride is precipitated in a more flocculent form than calcium fluoride, waters containing much magnesium (Mg) salts may be treated effectually with the fluoride alone, unless for other reasons, hereinafter to be stated, it should be otherwise indicated. Since caustic soda (sodium hydrate) causes a bulky precipitate when added to waters containing calcium (Ca) salts, it may be employed with a fluoride for the above-mentioned purpose.

In certain cases sodium carbonate will prove effective for the purpose above suggested. In other cases sodium carbonate, sodium hydrate, and a fluoride—such as sodium fluoride—may be used in the treatment of the water.

I have found that the use of either or both of the above-mentioned reagents in conjunction with a fluoride has in certain waters enabled me to treat the waters in a way which would prove more serviceable in practice than where a fluoride alone was used. Highly-carbonated water especially seemed to require the use of some caustic alkali.

The chemical equivalent of sodium carbonate or hydrate may be taken, unless it is incompatible with the fluoride employed.

That the quantity of each chemical may be properly adjusted, I either make a compound to be fed in calculated proportion, either in solid or liquid form, to the water to be treated, or dissolve each chemical in a separate tank or vessel and feed each to the water in such order and quantity as will produce the desired result—namely, that of removing foreign substances from the water.

Where highly-carbonated waters are to be fed after softening to boilers, it is frequently necessary not only to remove all substances which might form a crust or scale in the boiler, but to prevent foaming and frothing in the water so treated. For this purpose I have found sodium hydrate effectual when used in conjunction with a fluoride, such as sodium fluoride. By its use some or all of the carbon dioxide may be bound or fixed.

Where water is to be used in boilers, it is necessary to consider the character of the precipitate which may form, either through the imperfection of the treatment or of the mechanical process resorted to in removing the precipitate from the water previous to its entering the boiler. As it is possible in some cases to add the precipitating compound directly to the water in the boiler, additional caution must be used, either in the use of the fluoride alone or the fluoride with other chemicals, to prevent the formation of a preciptate which will by the action of the heat become a compact adherent scale. I have learned from experience that a careful study of the characteristics of the water should therefore precede the preparation of the compound to be used in its treatment on a large scale.

Milk of lime has been used for many years for softening waters possessing temporary hardness, the lime in solid form being held in suspension until mixed with the water. Fluoride may be used in a similar manner, bringing it, partly in solution partly in solid form, into contact with the water, or it may be employed in conjunction with such other chemicals as before specified, or their chemical equivalents, for the purposes mentioned.

When necessary, the application of fluoride to the water may either precede or follow that of some other chemical. Thus, in waters of great temporary hardness, the water may be first treated with milk of lime, and by it most of the calcium, magnesium, and carbon dioxide be removed. Then any remaining calcium or magnesium may be removed by the use of fluoride alone, or combined with caustic or carbonated alkali, or both.

The relative cost of materials used to purify may determine the selection of the modifications of the use of fluoride.

Since magnesium (Mg) and other metals have a tendency to form double salts, and since the fluorides are frequently double in composition, it is not improbable that the precipitate produced by the use of a fluoride will be composed of or contain such double fluoride.

In brines calcium and magnesium sulphates frequently exist along with calcium and magnesium chlorides. By the use of barium or strontium chloride these sulphates may be converted into chlorides, the barium or strontium sulphate precipitating. The magnesium, calcium, and any excess of barium or strontium may then be precipitated by the use of sodium fluoride. A nearly pure solution of common salt (sodium chloride) can thus be obtained. With care the use of the foregoing reagents may be reversed.

Fluorides may be used alone where desired.

Where it is desirable to remove iron from the water, the iron may be precipitated as a fluoride.

Since alum and other salts of aluminium are employed in the treatment of the water for portable purposes, any aluminium remaining in such water can be precipitated therefrom by the use of a fluoride.

I have mentioned above some of the methods capable of being used in precipitating compounds of fluorine; but since I believe I am the first to discover the practical application of any compound of fluorine to the removal of foreign substances from waters, brines, &c., I do not wish to be understood as limiting my invention to the methods mentioned above, having given these for the purpose of illustration merely.

I wish to be understood as claiming, broadly, the use of any fluorine compound in any way for the removal of different foreign substances from waters, brines, &c.; and in this connection I would state, by way of illustration, that I consider hydrofluoric acid, ammonium fluoride, "acid ammonium fluoride," potassium fluoride, sodium fluoride, cryolite, &c., as fluorine compounds.

What I desire to claim and secure by Letters Patent is—

The herein-described process for removing calcium, magnesium, and other like substances from waters, brines, &c., the same consisting in introducing into said waters, brines, &c., a fluorine compound, whereby the calcium or other substance is converted into an insoluble fluorine compound, substantially as described.

CHARLES A. DOREMUS.

Witnesses:
 CHARLES W. GOULD,
 R. W. G. WELLING.